United States Patent
Huang

(10) Patent No.: US 8,855,038 B2
(45) Date of Patent: Oct. 7, 2014

(54) METHODS AND SYSTEMS FOR HANDLING UNSUCCESSFUL RECEPTION IN BROADCAST/MULTICAST SERVICE

(75) Inventor: Guangping Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 13/257,928

(22) PCT Filed: Aug. 20, 2010

(86) PCT No.: PCT/CN2010/076203
§ 371 (c)(1),
(2), (4) Date: Mar. 16, 2012

(87) PCT Pub. No.: WO2011/032448
PCT Pub. Date: Mar. 24, 2011

(65) Prior Publication Data
US 2012/0195247 A1   Aug. 2, 2012

(30) Foreign Application Priority Data

Sep. 18, 2009   (CN) .......................... 2009 1 0093334

(51) Int. Cl.
| | |
|---|---|
| H04H 20/71 | (2008.01) |
| H04W 28/04 | (2009.01) |
| H04L 1/00 | (2006.01) |
| H04W 4/06 | (2009.01) |
| H04W 4/12 | (2009.01) |

(52) U.S. Cl.
CPC ....... *H04W 28/04* (2013.01); *H04L 2001/0093* (2013.01); *H04W 4/06* (2013.01); *H04W 4/12* (2013.01)
USPC ............ 370/312; 370/328; 370/390; 370/392

(58) Field of Classification Search
CPC ..... H04W 28/04; H04W 4/06; H04W 76/002; H04L 2001/0093; H04L 12/1868; H04N 21/6375
See application file for complete search history.

(56) References Cited

U.S. PATENT DOCUMENTS

| | | | |
|---|---|---|---|
| 2002/0025777 A1* | 2/2002 | Kawamata et al. | 455/3.05 |
| 2006/0146822 A1* | 7/2006 | Kolakowski et al. | 370/390 |

(Continued)

FOREIGN PATENT DOCUMENTS

| | | |
|---|---|---|
| CN | 101146215 A | 3/2008 |
| CN | 101431661 A | 5/2009 |
| WO | 2007040292 A1 | 4/2007 |

OTHER PUBLICATIONS

International Search Report in international application No. PCT/CN2010/076203, mailed on Dec. 2, 2010.

(Continued)

*Primary Examiner* — Jung Park
(74) *Attorney, Agent, or Firm* — Oppedahl Patent Law Firm LLC

(57) ABSTRACT

The present disclosure discloses a method for handling unsuccessful reception in broadcast/multicast service. The method comprises: the user terminal which fails to receive broadcasted/multicasted service contents obtains the service contents actively or passively after a mobile data broadcast/multicast platform broadcasts/multicasts the service contents. The present disclosure also discloses a system for handling unsuccessful reception in broadcast/multicast service, in which an obtaining unit is configured to obtain the service contents actively or passively by the user terminal which fails to receive the broadcasted/multicasted service contents after the mobile data broadcast/multicast platform broadcasts/multicasts the service contents. By the method and system provided in the present disclosure, handling of the unsuccessful reception of broadcasted/multicasted service contents can be triggered and realized by the user terminal.

5 Claims, 2 Drawing Sheets

(56) References Cited

U.S. PATENT DOCUMENTS

| | | | |
|---|---|---|---|
| 2007/0124784 A1* | 5/2007 | Shon et al. | 725/105 |
| 2009/0190586 A1 | 7/2009 | Kim | |
| 2009/0260046 A1 | 10/2009 | Yang | |
| 2012/0225696 A1* | 9/2012 | Kitani et al. | 455/566 |

OTHER PUBLICATIONS

English Translation of the Written Opinion of the International Search Authority in international application No. PCT/CN2010/076203, mailed on Dec. 2, 2010.

\* cited by examiner

METHODS AND SYSTEMS FOR HANDLING UNSUCCESSFUL RECEPTION IN BROADCAST/MULTICAST SERVICE

TECHNICAL FIELD

The present disclosure relates to the field of wireless communication technology, and in particular to methods and systems used in mobile multimedia broadcast/multicast service for handling unsuccessful reception in broadcast/multicast service.

BACKGROUND

In recent years, digital mobile multimedia broadcast/multicast technologies and standards are developing rapidly. As a new transmission mode of multimedia contents, mobile multimedia broadcast/multicast service receives considerable attention around the world all the time and its operation prospect attracts a lot of enterprises on the supply chain upstream and downstream to plunge into the industrialization development. It is illustrated below by taking broadcast technologies as an example.

For example, European Digital Video Broadcast Handheld (DVB-H), American Media Forward Link Only (MediaFLO) and China Mobile Multimedia Broadcasting (CMMB) and the like all adopt a unidirectional broadcast mode to provide users with various service contents, such as advertisement, weather forecast, news, sports program, variety show, multimedia radio play, movie and so on. Users can select service contents of Mobile Multimedia Broadcast according to their own interests.

Data broadcast, as one of the two major services of Mobile Multimedia Broadcast, take a role of performing encapsulation, multiplexing for data services on mobile data Broadcast (BCAST) platform according to protocols and then transmitting, through a broadcast channel, to user terminals with data broadcast reception abilities. The user terminal can perform analyze of the data and display the data to the final users.

Data service is mainly classified into two modes including a flow and a file, based on which the BCAST platform performs protocol encapsulating for specific data contents according to the two modes, respectively; therefore, it is necessary for the user terminals to be provided with corresponding function modules for reception and analysis of broadcast data contents. The data broadcast supports the data of both the two modes including the flow and the file which theoretically cover all types of data service, including various types of media, such as text, pictures, audio media and video media, so as to provide the mobile data broadcasting users with wide varieties of services and abundant experiences.

However, in the mobile multimedia broadcast services, compared with the transmission of the multimedia service contents in a unicast manner through a common multimedia message center, the transmission of the multimedia service contents in a broadcast manner through the BCAST platform brings a significant improvement and at the same time simplifies the transmission flow, however, the problem on how to process in a situation that the user terminal has not receive the broadcasted service contents due to a certain reason after the BCAST platform transmits the multimedia service contents in the broadcast manner, that is, in a situation of unsuccessful reception in the broadcasted service, has not been resolved yet; the similar problem also exists in the multicast technology.

SUMMARY

In view of the above problem, the main purpose of the present disclosure is to provide a method and system for handling unsuccessful reception in broadcast/multicast service, by which handling of the unsuccessful reception of the broadcasted/multicasted service contents can be realized through triggering by the user terminal.

In order to achieve the purpose above, the technical solution of the present disclosure is realized by:

A method for handling an unsuccessful reception in broadcast/multicast service, which comprises: after broadcasting/multicasting, by a mobile data broadcast/multicast platform, service contents, obtaining actively or passively, by a user terminal which fails to receive the broadcasted/multicasted service contents, the broadcasted/multicasted service contents.

The method may further comprise: before broadcasting/multicasting, by the mobile data broadcast/multicast platform, the service contents, issuing, by a service content provider, the same service contents to the mobile data broadcast/multicast platform and to a service center which unicasts the service contents, respectively.

Obtaining actively the service contents may further comprise:

requesting actively, by the user terminal which fails to receive the broadcasted/multicasted service contents, the service contents from the service center; and obtaining the service contents directly from the service center.

The method may further comprise:

determining, by the user terminal which fails to receive the broadcasted/multicasted service contents, the broadcasted/multicasted service contents which is failed to be received based on service guidance information sent by the mobile data broadcast/multicast platform; and sending, by the user terminal which fails to receive the broadcasted/multicasted service contents to the service center, a request for the broadcasted/multicasted service contents.

The method may further comprise: after receiving, by the service center, the request, further performing a content-match based on the requested service contents and transmitting matched service contents to the user terminal which fails to receive the broadcasted/multicasted service contents.

Obtaining passively the service contents may further comprise:

sending, by a user terminal which receives the broadcasted/multicasted service contents to the service center, an acknowledgement message, and sending, by the service center to the user terminal which fails to receive the broadcasted/multicasted service contents and accordingly does not send the acknowledgement message, a notification message; and obtaining, by the user terminal which fails to receive the broadcasted/multicasted service contents, the service contents indirectly from the service center through interaction with the service center.

The method may further comprise: before issuing, by the service content provider, the same service contents to the mobile data broadcast/multicast platform and to the service center, respectively, reporting, by the mobile data broadcast/multicast platform to the service content provider, user subscription information, and issuing, by the service content provider, the user subscription information to the service center; and performing, by the service center, a selection among user terminals which fail to receive the broadcasted/multicasted service contents based on the user subscription information, and sending the notification message to a user terminal selected as complying with the user subscription information.

A system for handling an unsuccessful reception in broadcast/multicast service, which comprises an obtaining unit configured to: after a mobile data broadcast/multicast platform broadcasts/multicasts service contents, allow a user terminal, which fails to receive the broadcasted/multicasted service contents, to obtain actively or passively the broadcasted/multicasted service contents.

The system may further comprise a sending unit configured to:

allow a service content provider to issue the same service contents to the mobile data broadcast/multicast platform and to a service center which unicasts the service contents, respectively.

The obtaining unit may be further configured to:

if being configured as obtaining the service contents actively, allow the user terminal, which fails to receive the broadcasted/multicasted service contents, to request actively the service contents from the service center, and to obtain the service contents directly from the service center.

The obtaining unit may be further configured to:

if being configured as obtaining the broadcasted/multicasted service contents passively, allow the user terminal, which receives the broadcasted/multicasted service contents, to send to the service center an acknowledgement message, and allow the service center to send a notification message to the user terminal, which fails to receive the broadcasted/multicasted service contents and accordingly does not send the acknowledgement message; and allow the user terminal, which fails to receive the broadcasted/multicasted service contents, to obtain the service contents indirectly from the service center through interaction with the service center.

In the present disclosure, the user terminal which fails to receive the broadcasted/multicasted service contents obtains the service contents actively or passively after the mobile data broadcast/multicast platform broadcasts/multicasts the service contents.

By adopting the present disclosure, after the mobile data broadcast/multicast platform broadcasts/multicasts the broadcasted/multicasted service contents in a broadcast/multicast manner, the user terminals can respond to the service contents broadcasted/multicasted by the mobile data broadcast/multicast platform so as to perfect the processing flow of the broadcast/multicast service; besides, the present disclosure provides a compensation mechanism for the user terminal which fails to receive the broadcasted/multicasted service contents, the compensation mechanism is: the user terminal triggers the implementation process in case of unsuccessful reception of the service contents through responding to the multimedia message contents broadcasted/multicasted by the mobile data broadcast/multicast platform, and obtains the service contents actively or passively, so as to guarantee user's interest and improve user experience.

DETAILED DESCRIPTION

Figure 1:
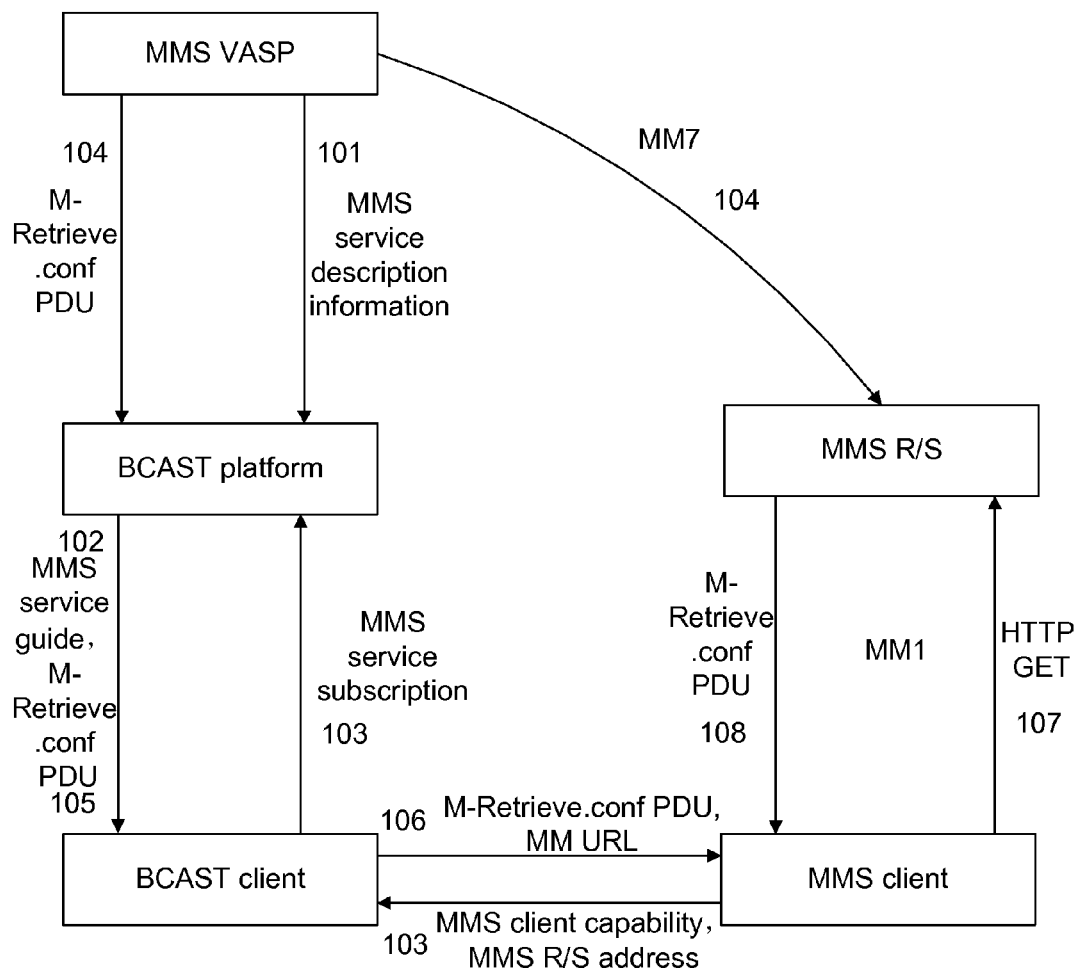
FIG. 1 shows a schematic diagram of an implementation flow of a method according to a first embodiment of the present disclosure.

The basic idea of the present disclosure is to allow a user terminal, if failing to receive service contents broadcasted/multicasted by a mobile data broadcast/multicast platform, to obtain the service contents actively or passively.

The implementation of the technical solution is further described hereinafter in detail with reference to accompanying drawings.

A method for handling unsuccessful reception in a broadcast/multicast service, includes that after a mobile data broadcast/multicast platform broadcasts/multicasts service contents, a user terminal which fails to receive the broadcasted/multicasted service contents obtains the service contents actively or passively. The method is illustrated below by taking broadcast technology as an example. When broadcast technology is applied, the mobile data broadcast/multicast platform may include a BCAST platform.

Specifically, in the method based on a BCAST platform, the BCAST platform broadcasts the service contents to each user terminal in a broadcast manner through a broadcast channel, and the user terminals receive the service contents broadcasted by the BCAST platform through the broadcast channel. Therefore, if a user terminal fails to receive the broadcasted service contents, the user terminal is a user terminal which fails to normally receive the broadcasted service contents through the broadcast channel, or called "a user terminal which fails to receive the broadcasted service contents" for short.

Here, the method may further include, before the BCAST platform broadcasts the service contents, a service content provider issues the same service contents to the BCAST platform and to a service center which unicasts the service contents, respectively.

In this method, the service center may include a multimedia message center, and the service contents may include multimedia message contents.

Hereinafter, different implementations for obtaining the service contents actively or passively are illustrated in detail, respectively.

The first case is: directly obtaining the service contents actively.

In this case, the step of obtaining the service contents actively specifically includes: the user terminal which fails to receive the broadcasted service contents actively requests the service contents from the service center, and then directly obtains the service contents from the service center.

Here, the user terminal which fails to receive the broadcast service contents further determines, according to service guide information transmitted by the BCAST platform, the broadcasted service contents which fail to be received, and sends, to the service center, a request for the broadcasted service contents which fail to be received.

Here, after receiving the request sent from the user terminal which fails to receive the broadcasted service contents, the service center further performs a content-match based on the requested broadcasted service contents which fail to be received, and transmits the matched service contents to the user terminal which fails to receive the broadcasted service contents;

The second case is: indirectly obtaining the service contents passively.

In this case, the step of obtaining the service contents passively specifically includes: the user terminal which receives the broadcasted service contents sends an acknowledgement message to the service center, and then the service center sends a notification message to the user terminal which fails to receive the broadcasted service contents and accordingly does not send the acknowledgement message; the user terminal which fails to receive the broadcasted service contents indirectly obtains the service contents from the service center through interaction with the service center.

Here, the method further includes: before the service content provider respectively issues the same service contents to the BCAST platform and to the service center, the BCAST platform reports user subscription information to the service content provider which then issues the user subscription information to the service center; and the service center first performs a selection among the user terminals which fail to receive the broadcasted service contents based on the user subscription information and then sends the notification message to the user terminals selected as complying with the user subscription information.

For the case of broadcasting Multimedia Message Service (MMS) contents through the BCAST platform, the main content of the present disclosure are illustrated below.

The present disclosure perfects the scheme of issuing MMS contents through the BCAST platform, reuses the MMS content analyzing function provided on most user terminals, overcomes the traffic and flow limitations of MMS service born on the current wireless communication network and brings an significant improvement to the MMS service experience of user. In order to guarantee the benefit of user, the present disclosure also provides a compensation mechanism triggered by the user terminal to handle the procedure of MMS unsuccessful reception; for example, through sending an acknowledgement message by the user terminal, feeding back a notification message by the MMS center and performing interaction of interactive network between the two, or, through a request from the user terminal for directly obtaining the contents, in order to guarantee that the user terminal which fails to normally receive the multimedia message contents through a broadcast channel can finally receive the missed MMS contents which fail to be received. The flow of handling unsuccessful reception of multimedia message mainly includes the followings:

1: the service content provider, that is Multimedia Messaging Service Value-Added Service Provider (MMS VASP), provides the BCAST platform with service description information, such as content size and media format;

here, the MMS VASP, serving as the MMS service content provider, performs data interaction with the BCAST platform through a specific data interface protocol, such as Wireless Session Protocol (WSP); the specific definitions of the interface and protocol are not in the protection scope of the present disclosure;

2: the BCAST platform sends a service guide to a MMS subscriber, wherein the service guide includes service time schedule, charging, access and so on;

3: the user terminal subscribes the broadcast multimedia message service provided by the BCAST platform, such as mobile newspaper, electronic magazine and so on;

4: the MMS VASP issues the same MMS service contents to a BCAST platform and an MMS center (i.e., an MMS R/S), respectively, wherein the MMS VASP interacts with the BCAST platform, by adopting WSP protocol, and adopting encoded M-Retrieve.Conf PDU, that is, encoded M-Retrieve.conf Protocol Data Unit; and the MMS VASP interacts with the MMS R/S, by adopting MM7 protocol;

here, the MMS VASP issues the MMS service contents to the MMS R/S which then stores and processes the obtained service contents in a delayed obtaining state, such that the user terminal, which missed to receive the broadcasted service contents, can actively obtain the service contents;

5: the BCAST platform issues the MMS service contents to the user terminal which subscribes the MMS service through a broadcast channel; a BCAST client of the user terminal receives the service contents instead of the user terminal, and forwards the service contents to the MMS client of the user terminal;

6: the BCAST client forwards the MMS service contents received instead of the user terminal to the MMS client which then displays the MMS service contents to user;

here, the BCAST client and the MMS client performs data interaction through a data interface protocol, however, the protocol is not in the scope of the present disclosure;

7: the user terminal which fails to receive the broadcasted service contents knows missing of the service based on the service guide information and actively initializes an obtaining request to the corresponding MMS R/S;

8: the MMS R/S receives the obtaining request, performs content-match based on the request by the user terminal and transmits the MMS service contents to the user terminal in a response message; then the MMS client of the user terminal displays the contents to user;

here, regarding to the described sixth item above, after successfully receiving and processing the MMS service contents, the MMS client of the user terminal may also send an acknowledgement message to the MMS R/S; and further, the MMS R/S will perform subsequent flows such as charging according to the received acknowledgement message; further, the MMS R/S will send a notification message to the user terminal which does not send the acknowledgement message successfully; then the user terminal obtains the MMS service contents through a normal MM1 multimedia message obtaining flow.

The present disclosure is illustrated below by examples.

The method of the BCAST platform transmitting multimedia message data according to the present disclosure is applicable to the mobile multimedia broadcast service realized through mobile communication network, wherein the system environment involved in the present disclosure mainly includes three parts: the BCAST platform, a broadcast network and the user terminal, particularly the mobile terminal which includes various cards cooperated to use.

Embodiment 1: directly obtaining the MMS service contents actively after the BCAST platform issues the MMS service contents; as shown in FIG. 1, the implementation flow of the embodiment includes the following steps:

step 101: the MMS VASP provides MMS service description information to the BCAST platform;

step 102: the BCAST platform sends MMS service guide to the MMS subscribers;

step 103: the mobile terminal subscribes the broadcast MMS service provided by the BCAST platform;

step 104: the MMS VASP issues MMS service contents to the BCAST platform and the MMS R/S, respectively;

step 105: the BCAST platform issues the MMS service contents to the mobile terminal which subscribes the MMS service through a broadcast channel; then the BCAST client of the mobile terminal receives the MMS service contents;

step 106: the BCAST client forwards the received MMS service contents to the MMS client which then displays the MMS service contents to the user;

step 107: the mobile terminal which fails to receive the broadcasted service contents actively initializes an obtaining request to the corresponding MMS R/S through the MMS client; and step 108: the MMS R/S receives the obtaining request, performs content-match for the mobile terminal and issues the MMS service contents to the mobile terminal; then the MMS client of the mobile terminal displays the contents to the user.

Figure 2:
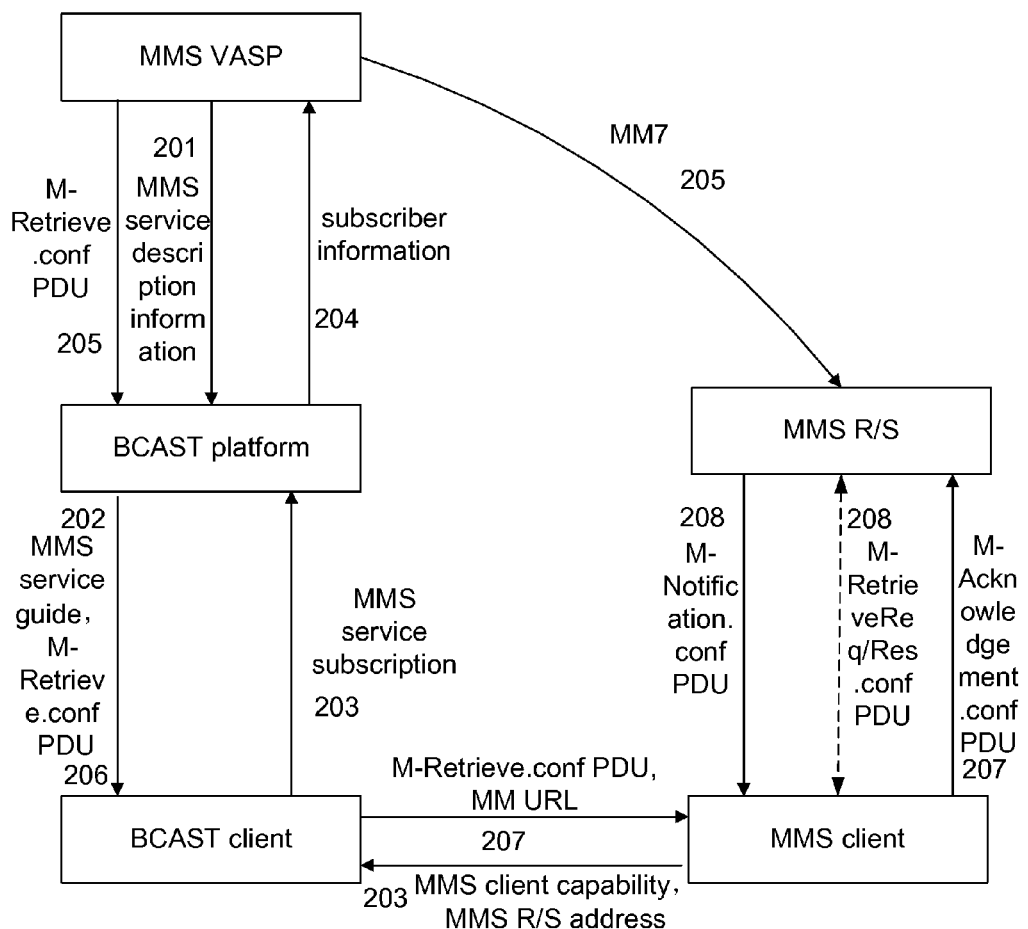
FIG. 2 shows a schematic diagram of an implementation flow of a method according to a second embodiment of the present disclosure.

Embodiment 2: indirectly obtaining the MMS service contents passively after the BCAST platform issues the MMS service contents; as shown in FIG. 2, the implementation flow of the embodiment includes the following steps:

step 201: the MMS VASP provides BCAST platform with MMS service description information;

step 202: the BCAST platform sends MMS service guide to the MMS subscribers;

step 203: the mobile terminal subscribes the broadcast MMS service provided by the BCAST platform;

step 204: the BCAST platform uploads the subscription information of the user to the MMS VASP;

step 205: the MMS VASP issues the MMS service contents to the BCAST platform and to the MMS R/S, respectively;

step 206: the BCAST platform issues the MMS service contents to the mobile terminal which subscribes the MMS service through a broadcast channel; then the BCAST client of the mobile terminal receives the MMS service contents;

step 207: the BCAST client forwards the received MMS service contents to the MMS client, which then displays the MMS service contents to the user and at the same time sends an acknowledgement message to the MMS R/S; and step 208: the MMS R/S sends a notification message to the mobile terminal which does not send the acknowledgement message; the mobile terminal performs interaction through network with the MMS R/S through the MMS client and finally obtains the MMS service contents.

By far, the whole flow is ended.

In this way, by the present disclosure, the BCAST platform issues the MMS service contents to the user terminal in the form of common data service. The user terminal which fails to normally receive the broadcasted service contents knows that it missed the corresponding MMS service contents according to the service guide information, and then actively initialize an obtaining flow to the MMS R/S; or, the user terminal replies a reception acknowledgement message to the corresponding MMS R/S which accordingly sends a notification message to the user terminal which does not receive the MMS service contents successfully; the user terminal then obtains the multimedia message contents through an MM1 flow; in this way, the method not only guarantees the benefit of the user which subscribes the broadcast multimedia message service, but also avoids a complicated flow of a lot of users sending the acknowledgement message simultaneously.

A system for handling unsuccessful reception in broadcast service is provided, the system includes: an obtaining unit, which is configured to allow the user terminal which fails to receive the broadcasted service contents to obtain the service contents actively or passively after the BCAST platform broadcasts the service contents.

Here, the system further includes a sending unit, which is configured to allow the service content provider to respectively issue the same service contents to the BCAST platform and the service center which unicasts the service contents.

Hereinafter, different specific implementations of the obtaining unit which obtains the service contents actively or passively are illustrated respectively.

The first specific implementation is: in the case of obtaining the service contents actively, the obtaining unit is further configured to allow the user terminal which fails to receive the broadcasted service contents to actively request for the service contents from the service center and then directly obtain the service contents from the service center.

The second specific implementation is: in the case of obtaining the service contents passively, the obtaining unit is further configured to allow the user terminal which receives the broadcasted service contents to transmit an acknowledgement message to the service center, and configured to allow the service center to transmit a notification message to the user terminal which fails to receive the broadcasted service contents and accordingly does not transmit the acknowledgement message; and configured to allow the user terminal which fails to receive the broadcasted service contents to indirectly obtain the service contents from the service center through interaction with the service center.

The above are only the preferred embodiments of the present disclosure and not intended to limit the protection scope of the present disclosure.

The invention claimed is:

1. A method for handling an unsuccessful reception in broadcast/multicast service, comprising:

issuing, by a service content provider, a service content to a broadcast/multicast platform and an multimedia message service (MMS) center, respectively;

issuing, by the broadcast/multicast platform, the service content to mobile terminals which subscribe the service through a broadcast/multicast channel;

actively initiating, by a mobile terminal which fails to receive the broadcasted/multicasted service content, an obtaining request for the broadcasted/multicasted service content to the MMS center; and upon receiving the obtaining request, issuing, by the MMS center, the service content in a MMS message to the mobile terminal through a wireless communication network.

2. The method according to claim 1, wherein the method further comprises: after receiving, by the MMS center, the obtaining request, performing a content-match based on the requested service content and transmitting matched service content to the mobile terminal which fails to receive the broadcasted/multicasted service content.

3. A system for handling an unsuccessful reception in broadcast/multicast service, comprising:

a sending unit configured to allow a service content provider to issue a service content to a broadcast/multicast platform and to an multimedia message service (MMS) center, respectively;

an obtaining unit configured to: after a broadcast/multicast platform broadcasts/multicasts a service content, allow a user terminal, which fails to receive the broadcasted/multicasted service content, to actively initiate an obtaining request for the broadcasted/multicasted service content to the corresponding MMS center and receive the service content in a MMS message from the MMS center through a wireless communication network; or allow the user terminal, which receives the broadcasted/multicasted service contents, to send to the MMS center an acknowledgement message, and allow the MMS center to send a notification message to the user terminal, which fails to receive the broadcasted/multicasted service contents and accordingly does not send the acknowledgement message, and allow the user terminal, which fails to receive the broadcasted/multicasted service content, to receive a notification message from the MMS center and perform interaction with the MMS center through a wireless communication network to obtain the service content.

4. A method for handling an unsuccessful reception in broadcast/multicast service, comprising:

issuing, by a service content provider, a service content to a broadcast/multicast platform and to an multimedia message service (MMS) center, respectively;

issuing, by the broadcast/multicast platform, the service content to mobile terminals which subscribe the service through a broadcast/multicast channel;

transmitting, by mobile terminals which receive the broadcasted/multicasted service content, an acknowledgement message to the MMS center;

transmitting, by the MMS center, a notification message to a mobile terminal which does not send the acknowledgement message; and performing, by the mobile terminal, interaction through a wireless communication network with the MMS center to obtain the service content.

5. The method according to claim 4, wherein the method further comprises:

reporting, by the broadcast/multicast platform to the service content provider, user subscription information;

issuing, by the service content provider, the user subscription information to the MMS center; and performing, by the MMS center, a selection among mobile terminals which fail to receive the broadcasted/multicasted service contents based on the user subscription information, and sending the notification message to a mobile terminal selected as complying with the user subscription information.

* * * * *